United States Patent
Chun et al.

(10) Patent No.: US 9,862,236 B2
(45) Date of Patent: Jan. 9, 2018

(54) PNEUMATIC TIRE

(71) Applicant: HANKOOK TIRE CO., LTD., Seoul (KR)

(72) Inventors: Eun Chang Chun, Daejeon (KR); Seong Jun Park, Daejeon (KR)

(73) Assignee: HANKOOK TIRE CO., LTD. (KR)

( * ) Notice: Subject to any disclaimer, the term of this patent is extended or adjusted under 35 U.S.C. 154(b) by 787 days.

(21) Appl. No.: 14/072,770

(22) Filed: Nov. 5, 2013

(65) Prior Publication Data

US 2014/0138001 A1 May 22, 2014

(30) Foreign Application Priority Data

Nov. 22, 2012 (KR) .................. 10-2012-0132735

(51) Int. Cl.
*B60C 11/13* (2006.01)
*B60C 11/04* (2006.01)
(Continued)

(52) U.S. Cl.
CPC .......... *B60C 11/047* (2013.01); *B60C 11/042* (2013.01); *B60C 11/12* (2013.01);
(Continued)

(58) Field of Classification Search
CPC ..... B60C 11/042; B60C 11/047; B60C 11/12; B60C 11/1204; B60C 11/1353; B60C 11/1307; B60C 11/1315; B60C 2011/133; B60C 2011/1361; B60C 11/01; B60C 2011/013
(Continued)

(56) References Cited

U.S. PATENT DOCUMENTS 3,951,193 A * 4/1976 Yeager ................ B60C 11/0309
152/209.21
4,200,134 A * 4/1980 Takigawa ................ B60C 11/04
152/209.19
(Continued)

FOREIGN PATENT DOCUMENTS

JP 53128807 11/1978
JP 07117413 5/1995
(Continued)

OTHER PUBLICATIONS

English Abstract for JP 2009046052 printed on Jun. 13, 2016.*

*Primary Examiner* — Seyed Masoud Malekzadeh
(74) *Attorney, Agent, or Firm* — Renaissance IP Law Group LLP

(57) ABSTRACT

Provided is a pneumatic tire which can fundamentally prevent the phenomenon in which cracks are generated in the bottoms of grooves and the areas where the side walls of blocks meet the bottoms of grooves, can suppress irregular abrasion of the tread, can enhance the overall rigidity of the tread, and can also enhance the drainage performance. The pneumatic tire of the invention includes a tread, side walls and bead sections, with a large number of blocks compartmentalized by grooves being formed on the surface of the tread, and also includes reinforcing ribs that are positioned inside a groove and have their lower parts joined with the bottom of the groove, with one lateral surface of a reinforcing rib and one side wall of the groove being in contact.

3 Claims, 3 Drawing Sheets

(51) Int. Cl.
*B60C 11/01* (2006.01)
*B60C 11/12* (2006.01)

(52) U.S. Cl.
CPC ............ *B60C 11/125* (2013.01); *B60C 11/01* (2013.01); *B60C 11/1204* (2013.01); *B60C 11/1307* (2013.01); *B60C 11/1315* (2013.01); *B60C 11/1353* (2013.01); *B60C 2011/013* (2013.01); *B60C 2011/133* (2013.01); *B60C 2011/1338* (2013.01); *B60C 2011/1361* (2013.01)

(58) Field of Classification Search
USPC .................................................. 152/209.18
See application file for complete search history.

(56) References Cited

U.S. PATENT DOCUMENTS

| | | | | |
|---|---|---|---|---|
| 4,214,618 A | * | 7/1980 | Takigawa | B60C 11/01 152/209.16 |
| 4,271,885 A | * | 6/1981 | Takigawa | B60C 11/04 152/209.18 |
| 8,776,847 B2 | * | 7/2014 | De Benedittis | B60C 11/13 152/209.21 |
| 2007/0240801 A1 | * | 10/2007 | Tanaka | B60C 11/0302 152/209.21 |

FOREIGN PATENT DOCUMENTS

| | | | |
|---|---|---|---|
| JP | H07117413 A | 5/1995 | |
| JP | 09002026 | 1/1997 | |
| JP | 09002026 A | 1/1997 | |
| JP | 10338006 | 12/1998 | |
| JP | 10338006 A | 12/1998 | |
| JP | H11301211 A | 11/1999 | |
| JP | 2009046052 A * | 3/2009 | |
| JP | 2009137325 | 6/2009 | |
| KR | 20100065958 A | 6/2010 | |
| WO | WO 2009082394 A1 * | 7/2009 | ............ B60C 11/13 |

* cited by examiner

PNEUMATIC TIRE

BACKGROUND OF THE INVENTION

1. Field of the Invention

The present invention relates to a pneumatic tire.

2. Description of the Related Art

Generally, the tread of a pneumatic tire for vehicles is provided with a large number of grooves in order to secure various performances such as drain performance, braking performance and heat generation, and a number of blocks are formed in a compartmentalized manner by those grooves.

On the other hand, in general, when a tire runs, cracks are generated at the bottoms of the grooves or at the areas where the walls of blocks meet the bottoms of the grooves. Important causes of these groove cracking include the occasion when excessive lateral force is generated in the blocks of the tread depending on the use condition of the vehicle and the pavement state of the road, and cracks are generated in the grooves; the occasion in which as excessive level differences are formed in the road, fatigue and impact are transferred to the tire, and thus cracks are generated in the grooves; and the occasion in which foreign materials such as pebbles go into the grooves during the running of the vehicle and penetrate further into the inside, and thus cracks are generated in the grooves. Due to these causes, serious problems may occur in the product quality, performance and the like of the tire.

In order to solve the problems described above, technologies that enable prevention of the phenomenon of cracking through the design of the round values of the groove bottoms or the design of the groove width, have been suggested. However, these techniques have negligible effects of preventing the generation of cracks, and particularly, these technologies have a problem of being unable to fundamentally prevent the phenomenon in which cracks are generated in the grooves because grooves are continuously deformed as a result of the movement of the blocks that are contacted with the ground surface at the time of continuous running or steering of the vehicle (see Japanese Patent Application Laid-Open No. 2007-223480 (filed Sep. 6, 2007)).

SUMMARY OF THE INVENTION

The present invention was devised in order to solve the problems described above of the prior art, and an object of the present invention is to provide a pneumatic tire which can fundamentally prevent the phenomenon in which cracks are generated in the bottoms of grooves and the areas where the side walls of blocks meet the bottoms of grooves, can suppress irregular abrasion of the tread, can enhance the overall rigidity of the tread, and can also enhance the drainage performance.

According to an aspect of the present invention, there is provided a pneumatic tire including a tread, side walls and bead sections, with a number of blocks compartmentalized by grooves being formed on the surface of the tread, the pneumatic tire further including reinforcing ribs that are positioned in the inside of a groove and have their lower parts connected to the bottom of the groove, with one lateral side of each reinforcing rib being in contact with one side wall of the groove.

A cuff section is formed at the surface where a reinforcing rib and the groove are contacted.

The area where the cuff section of a reinforcing rib and the cuff section of a groove are joined, is subjected to rounding.

The center line of the reinforcing rib has a structure that is offset from one side wall of the groove.

The reinforcing ribs are separated at a certain interval along the circumferential direction of the tire.

The height of the reinforcing rib has a height of 80% to 90% relative to the height of the groove.

The width of the reinforcing rib has a width of 30% to 70% relative to the width of the groove.

The pneumatic tire according to the present invention has an effect that the phenomenon in which cracks are generated at the bottom of a groove and at the area where the side wall of a block meets the bottom of a groove, can be prevented by reinforcing ribs, and irregular abrasion of the tread can be suppressed. Accordingly, the pneumatic tire also has an effect that the product quality, performance or the like of the tire can be enhanced.

Furthermore, the reinforcing ribs and a side wall of the groove are engaged through the cuff sections, and in the case where relative movement occurs between a block and the reinforcing ribs, such an interconnected state enables an increase in the overall rigidity of the tread. Also, there is obtained an effect that as the reinforcing ribs absorb the braking force, a driving force is induced in the tread blocks, so that uniform abrasion can be induced.

Furthermore, the center line of the reinforcing ribs has a structure that is offset from one side wall of the grooves, and thus, the engagement force between the reinforcing ribs and the block can be further enhanced. Therefore, there is obtained an effect that stability of the tire at the time of running can be secured.

Furthermore, the reinforcing ribs are formed at a certain interval along the circumferential direction, so that there is obtained an effect that rigidity of the tread can be enhanced, and also, the drainage performance can be enhanced.

DETAILED DESCRIPTION OF THE PREFERRED EMBODIMENTS

Hereinafter, embodiments of the present invention will be described in detail with reference to the attached drawings so that those having ordinary skill in the art to which the present invention is pertained can easily carry out the invention. However, the present invention can be realized in various different forms, and is not intended to be limited to the Examples that will be described herein. For similar members described throughout the entire specification, the same reference symbols will be assigned.

Figure 1:
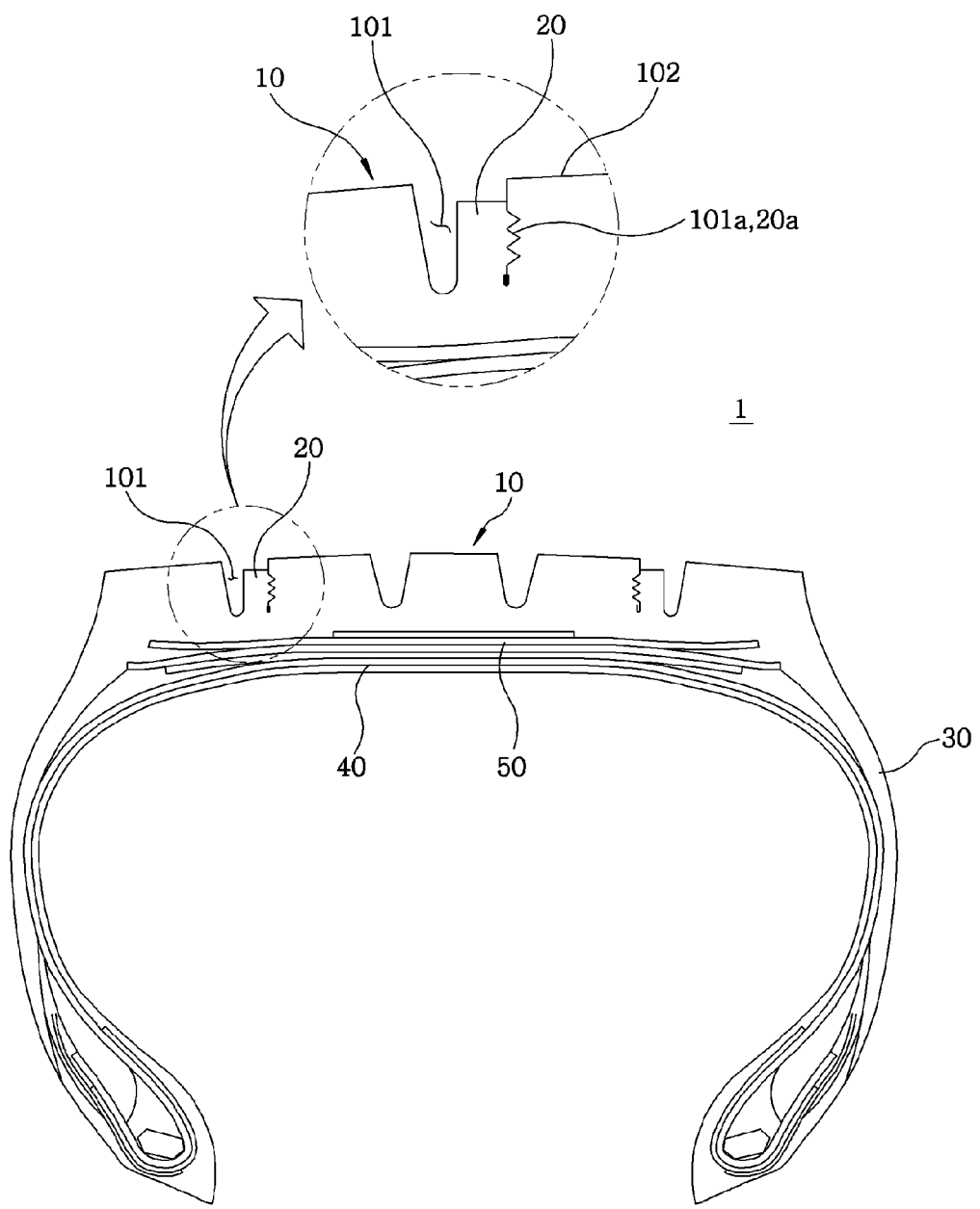
FIG. 1 is a cross-sectional diagram illustrating the pneumatic tire according to an embodiment of the present invention.
Figure 2:
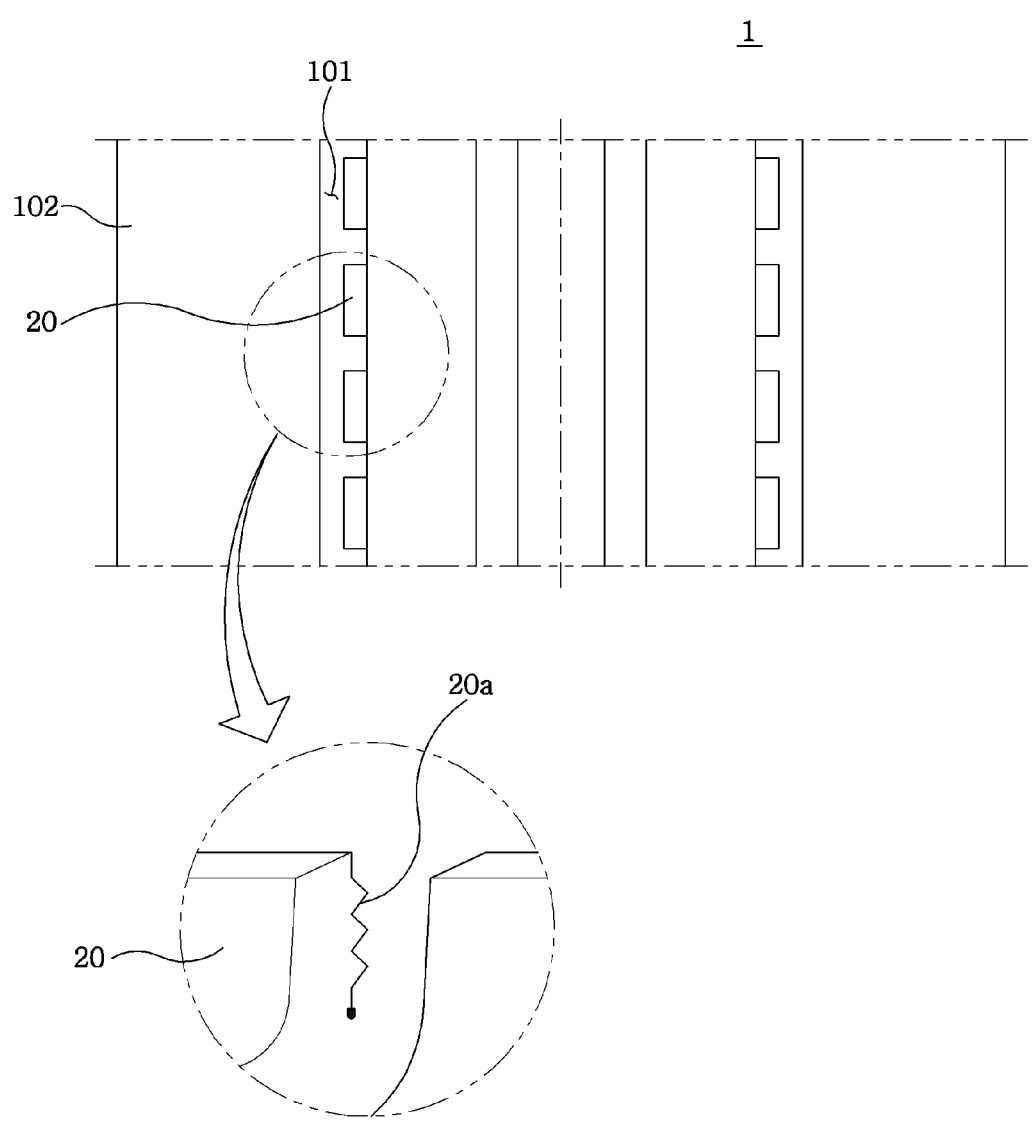
FIG. 2 is a plan view diagram illustrating the pneumatic tire according to an embodiment of the present invention.
Figure 3:
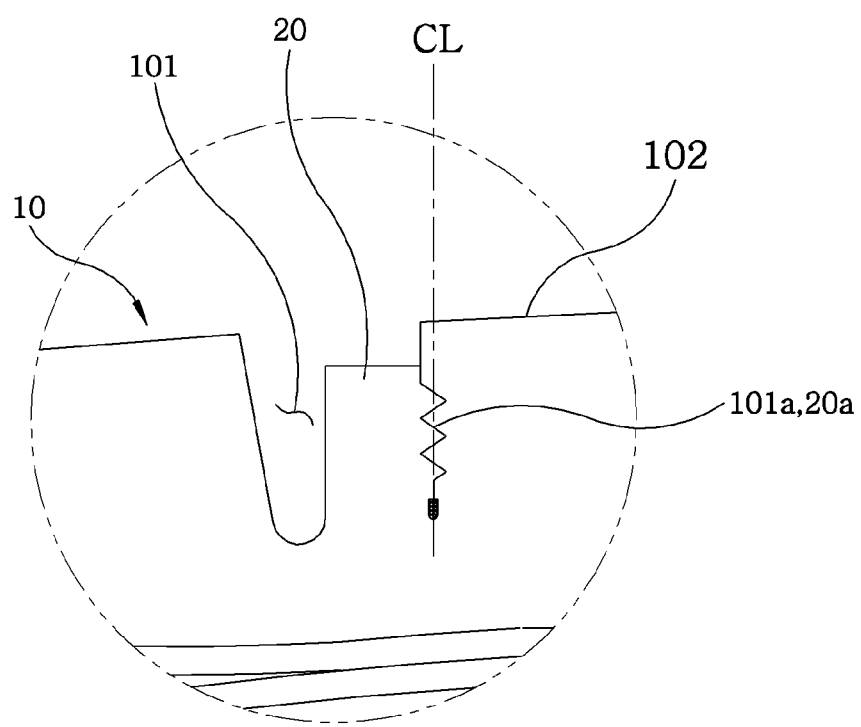
FIG. 3 is a cross-sectional diagram illustrating the reinforcing ribs and a block in the pneumatic tire according to an embodiment of the present invention.

FIG. 1 is a cross-sectional diagram illustrating the pneumatic tire according to the present invention, and FIG. 2 is a plan view diagram illustrating the pneumatic tire according to the present invention. FIG. 3 is a cross-sectional diagram illustrating the reinforcing ribs and blocks in the pneumatic tire according to the present invention.

According to FIG. 1 to FIG. 3, the pneumatic tire (1) according to the present invention is configured to include a tread (10), a side wall (30), and bead sections. The pneumatic tire has a number of blocks (102) that are compartmentalized by grooves (101) formed on the surface of the tread (10), and includes reinforcing ribs (20) that are positioned inside the grooves (101).

Furthermore, the pneumatic tire (1) according to the present invention further includes a carcass (40), a belt (50), and a rim (not shown in the diagram).

Since the bead sections (not shown in the diagram), carcass (40), belt (50) and rim (not shown in the diagram) are the same as the corresponding members in the configuration of a general pneumatic tire, specific explanations will not be repeated. In the following, descriptions will be given with an emphasis on the reinforcing ribs (20) only.

The reinforcing ribs (20) have their lower parts joined with the bottom of a groove (101). At this time, one lateral surface of a reinforcing rib (20) is in contact with one side wall of the groove (101). The reinforcing ribs (20) basically prevent any foreign materials such as pebbles from penetrating into the inside of the groove (101), and thus can guarantee the original service life of the tire. Specifically, the reinforcing ribs (20) are formed such that the height of a reinforcing rib is 80% to 90% relative to the height of the groove (101), and the width of the reinforcing rib is 30% to 70% relative to the width of the groove (101). Therefore, foreign materials such as relatively large stones or pebbles can be prevented from penetrating into the groove (101).

Accordingly, the occurrence of cracks at the bottom of the groove (101) and the area where the bottom of the groove (101) meets the side wall of the groove (101), where cracks are generated intensively, can be fundamentally prevented.

In addition, the reinforcing ribs (20) can suppress irregular abrasion of the tread (10).

More specifically, since the reinforcing ribs (20) are engaged with one side wall of the groove (101), the reinforcing ribs can absorb the braking force, and thereby induces a driving force in the block (102), so that uniform abrasion can be induced.

Furthermore, the center line (CL) of the reinforcing ribs (20) has a structure that is offset from one side wall of the groove (101). Therefore, the engagement force of the reinforcing ribs (20) and the block (102) can be further increased.

Furthermore, at the surfaces where the reinforcing ribs (20) and the groove (101) are contacted, cuff sections (20a and 101a) are respectively formed. The cuff sections (20a and 101a) are formed in a jagged form and are interdigitated. These cuff sections (20a and 101a) are engaged with each other when relative movement occurs between the block (102) and the reinforcing ribs (20), and thereby enhance the overall rigidity of the tread (10).

At this time, in the area where the cuff section (20a) of the reinforcing rib (20) and the cuff section (101a) of the groove (101) are joined, the cuff sections are perpendicularly disposed, tearing caused by stress concentration, chip cut, and abnormal abrasion of other grooves (101) may occur in the early stage. Therefore, in order to prevent this, the area where the cuff section (20a) of the reinforcing rib (20) and the cuff section (101a) of the groove (101) are joined is subjected to rounding.

Such reinforcing ribs (20) are separated at a certain interval along the circumferential direction.

That is, the reinforcing ribs (20) are formed at a certain interval along the circumferential direction, so that in the case where the vehicle runs on a wet road surface or runs in wet weather, water on a wet road or rain water can be made to be efficiently drained through the empty spaces formed between the grooves (101) and the reinforcing ribs (20).

Preferred embodiments of the present invention have been described in detail, but the scope of rights of the present invention is not intended to be limited to these, and various modifications and improvements made by a person having ordinary skill in the art utilizing the basic concept of the present invention defined in the following claims are construed to be included in the scope of rights of the present invention.

REFERENCE SYMBOLS

10: TREAD
101: GROOVE
101a, 20a: CUFF SECTION
102: BLOCK
20: REINFORCING RIB
30: SIDE WALL
40: CARCASS
50: BELT

What is claimed is:

1. A pneumatic tire comprising a tread, side walls and bead sections, and having a number of blocks that are compartmentalized by grooves formed on a surface of the tread, wherein the pneumatic tire further comprises:
   reinforcing ribs that are positioned inside a groove and have their lower parts joined with a bottom of the groove;
   wherein one lateral surface of each reinforcing rib and part of one side wall of the groove are formed in a jagged form in a radial direction to a center of the pneumatic tire and are formed as a cuff section by interdigitating with each other;
   wherein a centerline of each reinforcing rib has a structure that is offset from one sidewall of the groove;
      wherein the reinforcing ribs that are positioned inside the groove are spaced apart from each other at a certain interval along a circumferential direction of the pneumatic tire; and
   wherein an area where the cuff section of each reinforcing rib and the cuff section of the groove are joined is subjected to rounding.

2. The pneumatic tire according to claim 1, wherein a height of each reinforcing rib is 80% to 90% relative to a height of the groove.

3. The pneumatic tire according to claim 1, wherein a width of each reinforcing rib is 30% to 70% relative to a width of the groove.

* * * * *